United States Patent
Ohmi et al.

(10) Patent No.: US 7,368,092 B2
(45) Date of Patent: *May 6, 2008

(54) APPARATUS AND REACTOR FOR GENERATING AND FEEDING HIGH PURITY MOISTURE

(75) Inventors: Tadahiro Ohmi, 1-17-301, Komegahukuro 2-chome, Aoba-ku, Sendai-shi, Miyagi (JP) 980-0813; Nobukazu Ikeda, Osaka (JP); Yukio Minami, Osaka (JP); Kouji Kawada, Osaka (JP); Katunori Komehana, Osaka (JP); Teruo Honiden, Osaka (JP); Touru Hirai, Osaka (JP); Akihiro Morimoto, Osaka (JP); Toshirou Nariai, Osaka (JP); Keiji Hirao, Osaka (JP); Masaharu Taguchi, Osaka (JP); Osamu Nakamura, Osaka (JP)

(73) Assignees: Fujikin Incorporated, Osaka-shi (JP); Tadahiro Ohmi, Sendai-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/724,101

(22) Filed: Dec. 1, 2003

(65) Prior Publication Data

US 2004/0137744 A1 Jul. 15, 2004

Related U.S. Application Data

(60) Division of application No. 09/773,605, filed on Feb. 2, 2001, now Pat. No. 7,258,845, which is a continuation of application No. PCT/JP00/04911, filed on Jul. 21, 2000.

(30) Foreign Application Priority Data

Aug. 6, 1999 (JP) .................. 11-223548
Nov. 30, 1999 (JP) .................. 11-338882

(51) Int. Cl.
*B01J 19/24* (2006.01)
*B01J 8/02* (2006.01)
*C01B 5/00* (2006.01)

(52) U.S. Cl. .................. 422/198; 422/199; 422/129; 422/211; 423/580.1

(58) Field of Classification Search ........ 422/187–190, 422/211, 212, 220, 222, 168, 169, 171, 176, 422/177, 180, 198; 423/580.1; 376/300, 376/301; 976/DIG. 271; 165/80.3
See application file for complete search history.

(56) References Cited

U.S. PATENT DOCUMENTS 3,180,404 A * 4/1965 Nelson et al. ............... 165/47

(Continued)

FOREIGN PATENT DOCUMENTS

EP 650110 A1 * 4/1995

(Continued)

OTHER PUBLICATIONS

Kraus. Chapter 54: Cooling Electronic Equipment. Mechanical Engineers' Handbook. Second Edition. 1998. pp. 1649-1679.*

(Continued)

*Primary Examiner*—Jennifer A. Leung
(74) *Attorney, Agent, or Firm*—Griffin & Szipl, P.C.

(57) ABSTRACT

A safe, reduced pressure apparatus for generating water vapor from hydrogen and oxygen and feeding high purity moisture to processes such as semiconductor production. The apparatus eliminates the possibility of the gas igniting by maintaining the internal pressure of the catalytic reactor for generating moisture at a high level while supplying moisture gas from the reactor under reduced pressure. A heat dissipation reactor improvement substantially increases moisture generation without being an enlargement in size by efficient cooling of the reactor alumite-treated fins.

11 Claims, 10 Drawing Sheets

U.S. PATENT DOCUMENTS

| | | | |
|---|---|---|---|
| 3,755,075 A | | 8/1973 | Henrie |
| 3,859,053 A | * | 1/1975 | Parnes ........................ 422/199 |
| 4,369,838 A | * | 1/1983 | Asanuma et al. ........... 165/185 |
| 5,375,652 A | * | 12/1994 | Matsunaga et al. ........ 165/80.3 |
| 5,592,521 A | | 1/1997 | Hill |
| 6,093,662 A | | 7/2000 | Ohmi et al. |
| 6,180,067 B1 | | 1/2001 | Ohmi et al. |
| 6,274,098 B1 | | 8/2001 | Tanabe et al. |
| 6,334,962 B1 | | 1/2002 | Minami et al. |
| 6,733,732 B2 | | 5/2004 | Ohmi et al. |
| 6,919,056 B2 | | 7/2005 | Ohmi et al. |
| 7,008,598 B2 | | 3/2006 | Ohmi et al. |
| 2001/0048907 A1 | | 12/2001 | Ohmi et al. |
| 2002/0136676 A1 | | 9/2002 | Komehana et al. |
| 2004/0137744 A1 | | 7/2004 | Ohmi et al. |
| 2004/0247502 A1 | | 12/2004 | Ohmi et al. |

FOREIGN PATENT DOCUMENTS

| | | | |
|---|---|---|---|
| EP | 0 878 443 A1 | | 11/1998 |
| EP | 922667 A1 | * | 6/1999 |
| JP | 63-138220 A | | 6/1988 |
| JP | 6-147420 A | | 5/1994 |
| JP | 10-297907 A | | 11/1998 |
| JP | 11-084299 A | | 3/1999 |
| JP | 2000-72405 A | | 3/2000 |
| JP | 2000-169109 A2 | | 6/2000 |
| JP | 2000-169110 A2 | | 6/2000 |
| JP | 2006027974 A | * | 2/2006 |
| WO | WO 8912502 A1 | * | 12/1989 |
| WO | WO 97/48640 | | 12/1997 |
| WO | WO 98/57884 | | 6/1998 |

OTHER PUBLICATIONS

International Search Report, PCT/JP00/04911, Japanese Patent Office, completed Aug. 28, 2000, 4 pages.

Chemical Handbook, Fundamentals, Part II, Jun. 25, 1986, p. 406, Maruzen Publishing Company, Tokyo, Japan.

International Search Report for International Application No. PCT/JP00/04911, completed Aug. 28, 2000, at the Japanese Patent Office, and mailed Sep. 5, 2000.

Mechanical Engineer's Reference Book. Edited by Edward H. Smith. 12th Edition. 1994. Section "6.4 Fasteners."

* cited by examiner

APPARATUS AND REACTOR FOR GENERATING AND FEEDING HIGH PURITY MOISTURE

CROSS-REFERENCE TO RELATED APPLICATIONS

This application is a divisional application of U.S. patent application Ser. No. 09/773,605, filed Feb. 2, 2001, now U.S. Pat. No. 7,258,845, which is a continuation of PCT application JP00/04911, filed Jul. 21, 2000, and which claims priority from Japanese Patent Application Nos. JP11-223548, filed Aug. 6, 1999; and JP11-338882, filed Nov. 30, 1999; the entire disclosures of the above are hereby incorporated herein by reference.

FIELD OF THE INVENTION

The present invention relates to an apparatus for generating and feeding water-vapor, hereinafter referred to as moisture, and a moisture-generating catalytic reactor for use in the apparatus employed in the production of semi-conductors. More specifically, the present invention relates to a reduced pressure apparatus for generating and feeding moisture in which moisture gas is supplied under reduced pressure to the downstream side of the reactor while maintaining an elevated internal pressure in the portion of the reactor for generating moisture. The configuration thereby prevents hydrogen from spontaneously igniting in the reactor. The invention includes a heat dissipation-type reactor for generating moisture in which heat generated in the moisture generating reaction is forced to dissipate through fins, increasing the quantity of moisture generated within a safe temperature range.

BACKGROUND OF THE INVENTION

Silicon oxide film formation by moisture oxidation, for example, can need more than 1,000 sccm or cubic centimeters/minute of high-purity water in a standard state in semiconductor manufacturing. For that purpose, the inventors earlier developed and disclosed reactors for generating high purity moisture as shown in FIG. 5 and FIG. 6.

Figure 5:
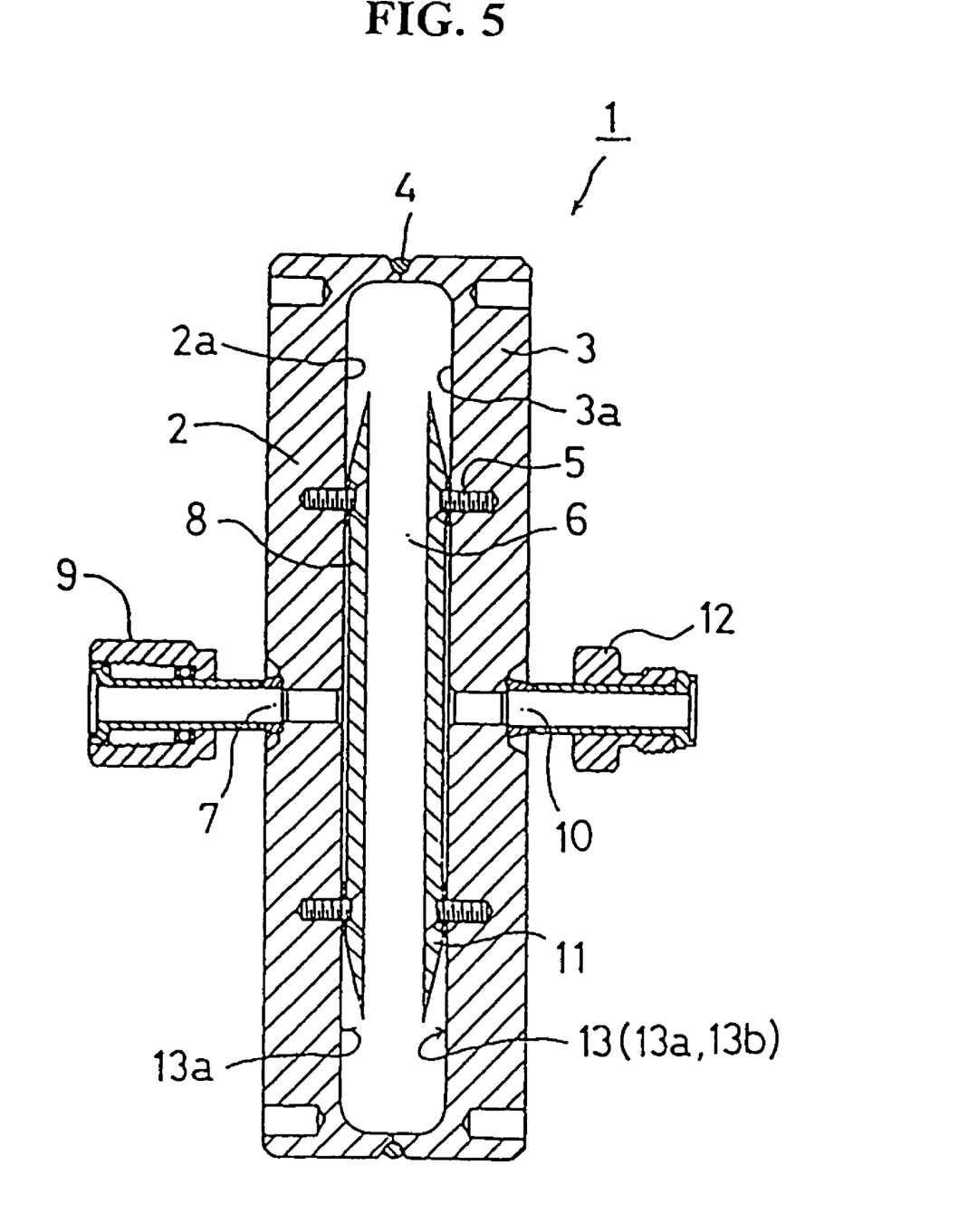
FIG. 5 is a sectional view of an example of the reactor for generating moisture.
Figure 6:
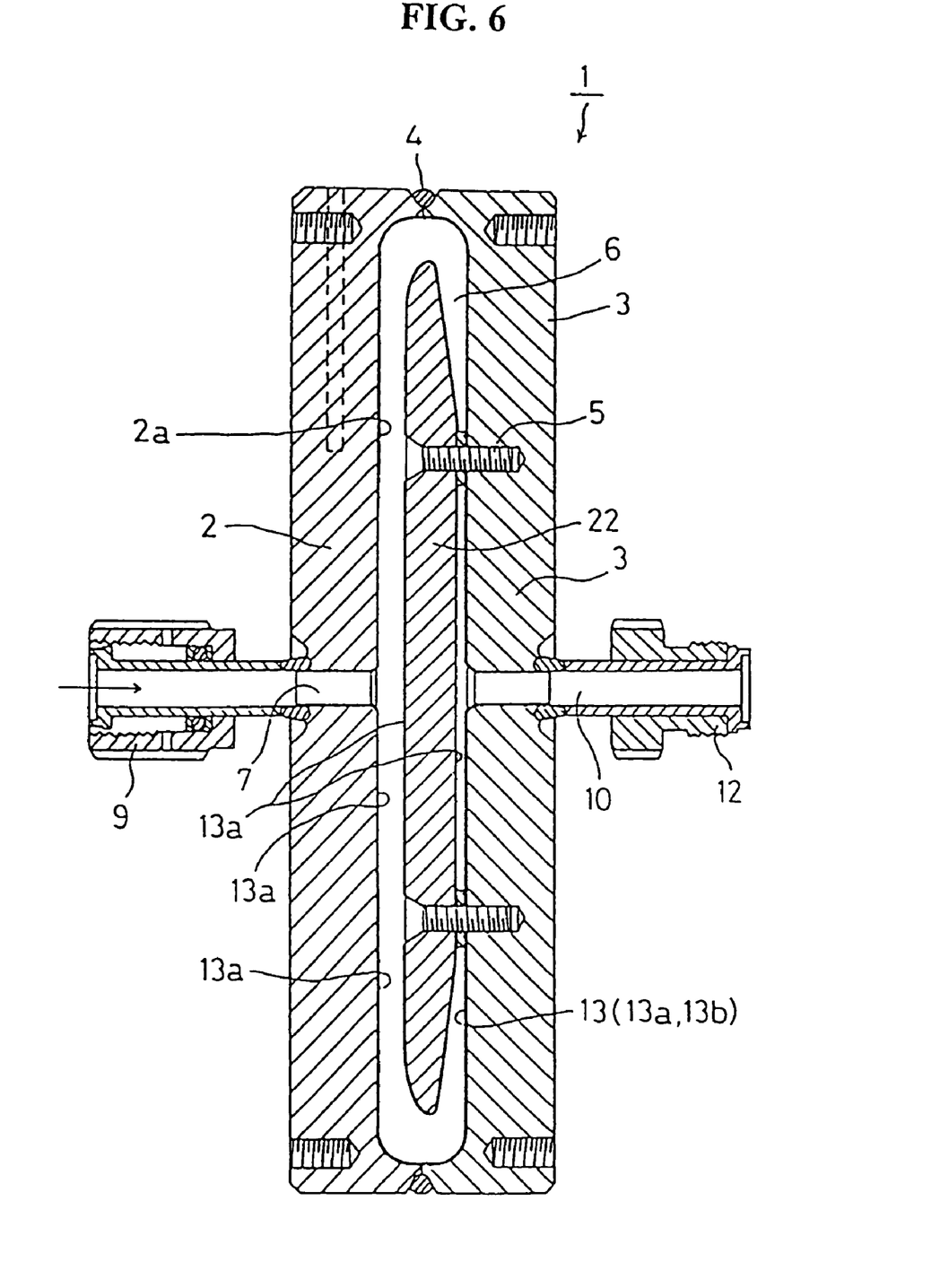
FIG. 6 is a sectional view of another example of the reactor for generating moisture.

The reactor shell 1 shown in FIG. 5 is formed by mating a reactor structural component 2 on the inlet side having a material gas supply joint 9 and a reactor structural component 3 on the outlet side having a moisture gas take-out joint 12. In the reactor shell 1, a reflector 8 on the inlet side is so clamped by screw bolts 5 as to face a material gas supply passage 7 and a reflector 11 on the outlet side to face a moisture gas outlet passage 10.

The inside wall surface of the reactor structural component 3 on the outlet side is provided with a platinum coated catalyst layer 13. The inside wall surface of the reactor structural component 2 on the inlet side and the outside surfaces of the reflector 8 on the inlet side and the reflector 11 on the outlet side are provided with a barrier coat 13a formed of a nitride such as TiN which will be described later.

The platinum coated catalyst layer 13 is formed on the barrier coat 13a of a nitride like TiN provided on the inside wall of the reactor structural component 3 on the outlet side by fixing the platinum coat 13b by vapor deposition technique, ion plating technique or the like.

In the reactor shell 1 shown in FIG. 6, there is provided a relatively thick reflector 22, and the inside surface of the reactor structural component 3 on the outlet side is provided with a platinum coated catalyst layer 13 formed of barrier coat 13a and platinum coat 13b.

The inside surface of the reactor structural component 2 on the inlet side and the outside surface of reflector 22 are provided with barrier coat 13a but without the platinum coat 13b described in FIG. 5. Thus, the surfaces of the reactor structural component 2 on the inlet side and reflector 22 are not catalytic, thereby preventing $O_2$ and $H_2$ from reacting on those surfaces and raising the temperature locally.

Referring again to FIG. 5, hydrogen and oxygen, i.e., the material gases, are fed into the reactor shell 1 through a material gas supply passage 7 and are diffused in the interior space 6 by the reflector 8 on the inlet side and the reflector 11 on the outlet side 11 and comes in contact with the platinum coated catalyst layer 13. Upon coming in contact with the platinum coated catalyst layer 13, oxygen and hydrogen are increased in reactivity by the catalytic action of platinum and are turned into the so-called radicalized state. As radicalized, the hydrogen and oxygen instantaneously react into moisture at a temperature lower than the ignition point of the mixed gas without high-temperature combustion. The high purity moisture is then supplied to the downstream side through the moisture gas outlet passage 10

Similarly, in the reactor shell 1 shown in FIG. 6, the material gases comprising hydrogen and oxygen are fed into the reactor shell 1 through the material gas supply passage 7 and hit against the reflector 22, diffusing in the interior space 6. The diffused material gases of hydrogen and oxygen come in contact with the platinum coated catalyst layer 13 and are converted into a radicalized state. As described above, hydrogen and oxygen instantaneously react to produce high purity moisture without combustion at a high temperature.

The reactor shell 1 of the construction as shown in FIG. 5 and FIG. 6 has attracted much attention in the semiconductor manufacturing technological field because it permits a substantial size reduction of the apparatus used for generating and feeding high purity moisture and can produce more than 1,000 cc/minute in a standard state with a higher reactivity and responsiveness.

Another feature of the reactor shell 1 of FIGS. 5 and 6 is that hydrogen and oxygen are handled at a temperature, e.g., 400° C., at which no spontaneous ignition takes place. Moisture is produced by catalytic reaction alone, and thus high-purity moisture can be secured and supplied safely.

Furthermore, the inventors have developed a number of techniques to raise the catalytic reaction efficiency in moisture generation according to the aforesaid catalytic reaction. To be specific, the inventors have improved the structure of the reactor to reduce the remaining hydrogen in the moisture gas by increasing the reaction between hydrogen and oxygen. Also, the inventors have developed a technique for increasing the reaction between hydrogen and oxygen by gradually increasing the flow rate of hydrogen; and another method of raising the reaction between hydrogen and oxygen by starting the supply of hydrogen after the supply of oxygen while cutting off the supply of hydrogen earlier than oxygen.

As a result of those techniques, the reactor shell 1 as shown in FIG. 5 and FIG. 6 can produce and supply high-purity moisture almost free of residual hydrogen However, the semiconductor manufacturing line has a large number of treatment processes in which moisture is fed under reduced pressure, for example, several Torr. In those processes, hydrogen and oxygen under reduced pressure are fed into the reactor shell 1 from the material gas supply passage 7. Consequently, there is a possibility in those reduced pressure processes that, with the ignition point dropping, hydrogen will spontaneously ignite in the reactor.

Figure 7:
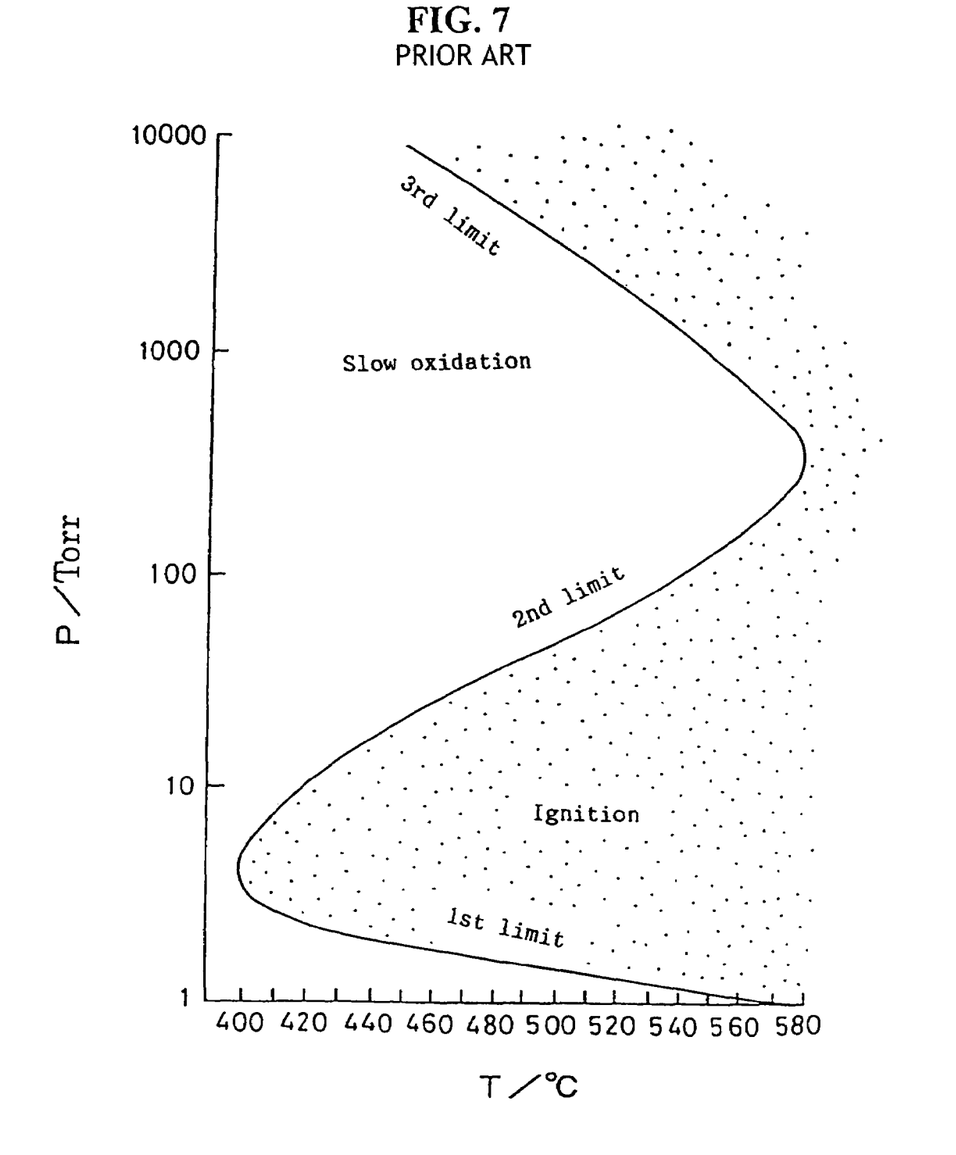
FIG. 7 (Prior Art) is an ignitability limit of a 2:1 (by volume) mixture of $H_2$-$O_2$.

FIG. 7 is an ignitability limit curve for a 2:1 (by volume) mixture of $H_2$-$O_2$ in a spherical container with a radius of 7.4 cm. The source of the curve is the third edition of a chemical handbook, fundamentals, II-406 published by Maruzen publishing company. The numbers on the ordinate indicate the total pressure of the mixed gas while those on the abscissa indicate the ignition temperature.

Assuming from FIG. 7 that when the temperature inside the reactor is set at 400° C. the total pressure of the mixed gas of hydrogen and oxygen is reduced to several Torr. FIG. 7 shows that the ignition point for several Torr of pressure is about 400° C. Under this condition, the ignition point approaches the set temperature, and hydrogen can ignite spontaneously in the reactor. If the set temperature is still higher, ignition will occur without fail.

As indicated in FIG. 7, the ignition point of hydrogen sharply drops as the total pressure of the mixed gas of hydrogen and oxygen decreases. Even if the temperature is so set that hydrogen will not ignite when the total pressure is high, it can happen that hydrogen will suddenly ignite if the total pressure drops. If hydrogen ignites in the reactor, its flame flows back toward the upstream side through the material gas supply passage 7 and there is danger that combustion will take place in the area where hydrogen and oxygen are mixed, melting and breaking the piping and causing a fire to spread outside the reactor.

Another problem with the reactor of FIGS. 5 and 6 for generating moisture is that since the moisture-generating reaction is an exothermic reaction, the generated reaction heat will overheat the whole of the reactor shell 1 and the generated vapor steam. For example, when water vapor is produced at the rate of 1,000 cc/minute, the temperature of water vapor reaches 400-450° C. because of self-heating. If the moisture generation is further increased, the temperature of water vapor will exceed 450° C. and approach the ignition point of hydrogen and oxygen or 560° C., bringing about a very dangerous state.

To avoid such a possibility, the upper limit of the moisture generation in the reactor for generating moisture of the prior art construction has to be 1,000 cc/minute in terms of the standard state. One way to increase the moisture generation is to enlarge the reactor shell 1. But the size increase raises the costs and enlarges the size of the apparatus for generating and feeding moisture.

The present invention solves those problems with the prior art reactor for generating moisture, including (1) the danger that ignition can occur when the total pressure of hydrogen and oxygen drops; and (2) moisture generation per unit volume is limited because the temperature of the reactor for generating moisture itself would rise and could cause ignition if the production of moisture is increased.

SUMMARY OF THE INVENTION

It is an object of the present invention to provide a safe reduced pressure-type apparatus for generating and feeding high purity moisture that completely eliminates the possibility of the gas igniting when the total pressure of the mixture of hydrogen and oxygen drops as mentioned above. It is another object of the present invention to provide a safe reduced pressure-type apparatus for generating and feeding moisture that totally prevents hydrogen from spontaneously igniting by feeding moisture gas under reduced pressure, thereby keeping the internal pressure of the reactor for generating moisture at a high level.

It is another object of the present invention to provide a heat-dissipation type reactor for generating moisture that is so designed to promote heat dissipation from the outside wall of the reactor so as to completely eliminate the danger of the gas igniting when the moisture generation increases as mentioned above. It is a further object of the present invention to provide a heat-dissipation type reactor for generating moisture that is small in size yet can produce moisture in a large quantity.

Reduced Pressure-Type Reactor for Generating Moisture

As set forth above, the apparatus for generating and feeding moisture according to the present invention has two objectives to achieve, that is, (1) to supply high-purity gas under reduced pressure to the downstream side, and (2) to keep the ignition point of hydrogen at a high level by raising the internal pressure in the reactor for generating moisture. Ignition is prevented by widening the difference between the ignition point and the temperature set for moisture generation in the reactor for generating moisture After intensive research in trying to solve those problems, the inventors discovered a means to simultaneously achieve the two objectives. It was discovered that, if a means for reducing pressure, such as an orifice and valve, are installed on the downstream side of the reactor, it is possible to generate moisture gas under a high pressure in the reactor for generating moisture and to supply the generated gas under a reduced pressure by squeezing or restricting the moisture gas flow by the means for reducing pressure.

The temperature of the reactor for generating moisture is set at 350° C., for example. If the total pressure of the mixed gas of hydrogen and oxygen is adjusted to 100-1,000 Torr and fed into the reactor for generating moisture, the ignition point is 540-580° C. according to FIG. 7. The difference between the ignition point and the set temperature is 190-230° C. and there is no possibility of hydrogen self-igniting. Keeping the temperature difference wide prevents hydrogen from igniting and makes it possible to supply moisture gas safely.

One aspect of the invention comprises a reduced pressure-type apparatus for generating and feeding moisture comprising a reactor for generating moisture from hydrogen and oxygen by catalytic reaction and a means for reducing pressure provided on the downstream side of the reactor. The moisture gas is reduced in pressure by the means for reducing pressure and supplied to the downstream side while, at the same time, the internal pressure in the reactor is maintained at a high level. The means for reducing pressure includes orifices, valves, capillaries or filters.

In the invention, the reactor for generating moisture comprises a reactor shell formed by mating a reactor structural component on the inlet side having a material gas supply joint and a reactor structural component on the outlet side having a moisture gas take-out joint, a reflector on the inlet side so provided in the reactor shell as to face a material gas supply passage, a reflector on the outlet side so provided in the reactor shell as to face the side of a moisture gas outlet passage, and a platinum coated catalyst layer provided on the inside wall-surface of the reactor structural component on the outlet side.

Further, in the invention, the reactor shell is formed by mating a reactor structural component on the outlet side having a moisture gas take-out joint, a reflector provided in the interior space of the reactor shell, and a platinum coated catalyst layer provided on the inside wall surface of the reactor structural component on the outlet side.

Heat Dissipation Type Reactor for Generating Moisture

The inventors have conducted intensive research in seeking to prevent excessive self-heating of the reactor for generating moisture and discovered a means for keeping the temperature from rising excessively by providing a large number of heat dissipation fins on the outside wall of the reactor used for generating moisture. That discovery made it possible to raise moisture generation from 1,000 cc/minute to 2,000 cc/minute without much increasing the size of the reactor for generating moisture. Furthermore, the heat dissipation efficiency could be raised more when the heat dissipation fins are alumite-treated, and the moisture generation could be furthermore increased up to 2,500 cc/minute.

One embodiment of the heat dissipating reactor of the invention provides a reactor shell having an interior space is formed by mating a reactor structural component on the inlet side and a reactor structural component on the outlet side, a material gas supply passage provided on the reactor structural component on the inlet side to supply the material gases into the interior space, a material gas supply joint connected to the material gas supply passage, a moisture gas outlet passage provided on the reactor structural component on the outlet side to lead out moisture gas from the interior space, a moisture gas take-out joint connected to the moisture gas outlet passage, fin base plates attached firmly on the outside wall of the reactor structural components and a large number of fins set up on the fin base plates. The fin base plate may be attached firmly on the outside wall of the reactor structural components with a heater and a heater press plate placed between.

In a further embodiment of the invention, the aforesaid heat dissipation fins are disposed central-symmetrically or axial-symmetrically with the material gas supply joint or the moisture gas take-out joint serving as center.

In another embodiment of the invention, the heat dissipation efficiency is improved by providing an alumite treatment to the surfaces of the heat dissipation fins

LIST OF REFERENCE LETTERS AND NUMERALS FOR THE DRAWINGS

BA baking area
C process chamber
F Filter
M mass analyzer
MFC 1-3 mass flow controllers MFC
P1, P2 pressure deflectors
R recorder
RM pressure reducing means
RP vacuum pump
S1, S2 hydrogen sensors
SV sampling valves
V1-V11 valve
WVG reactor for generating moisture
1 reactor shell
2 reactor structural component on the inlet side
2a recess
3 reactor structural component on the outlet side
3a recess
4 weld
5 screw bolt
6 interior space
7 material gas supply passage
8 reflector on the inlet side
9 material gas supply joint
10 moisture gas outlet passage
11 reflector on the outlet side
12 moisture gas take-out joint
13 platinum coated catalyst layer
13a barrier coat
13b platinum coat
14 heat dissipation unit
15 heater
16 heater pressing plate
17 fin base plate
18 heat dissipation fins
19 through hole for the joint
20 notch
21 fixing bolt hole
22 reflector
$P_1$-$P_3$ thermocouples for measurement of temperature distribution
P thermocouple for temperature regulation

DESCRIPTION OF THE PREFERRED EMBODIMENTS

The embodiments of the present invention will be described as follows with reference to the drawings, wherein like parts are given the reference numerals.

Figure 1:
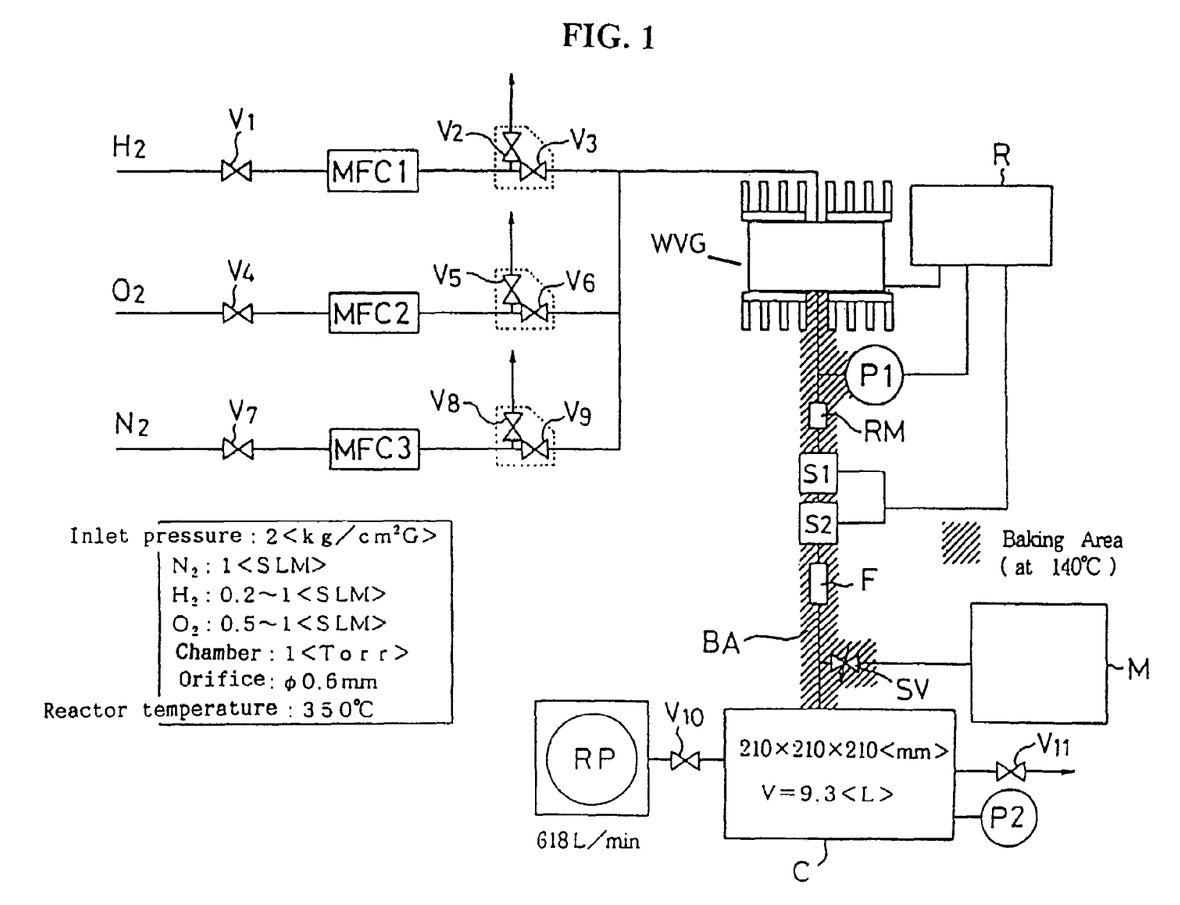
FIG. 1 is a schematic diagram of an embodiment of a reduced pressure-type apparatus for generating and feeding moisture according to the present invention.
Figure 8:
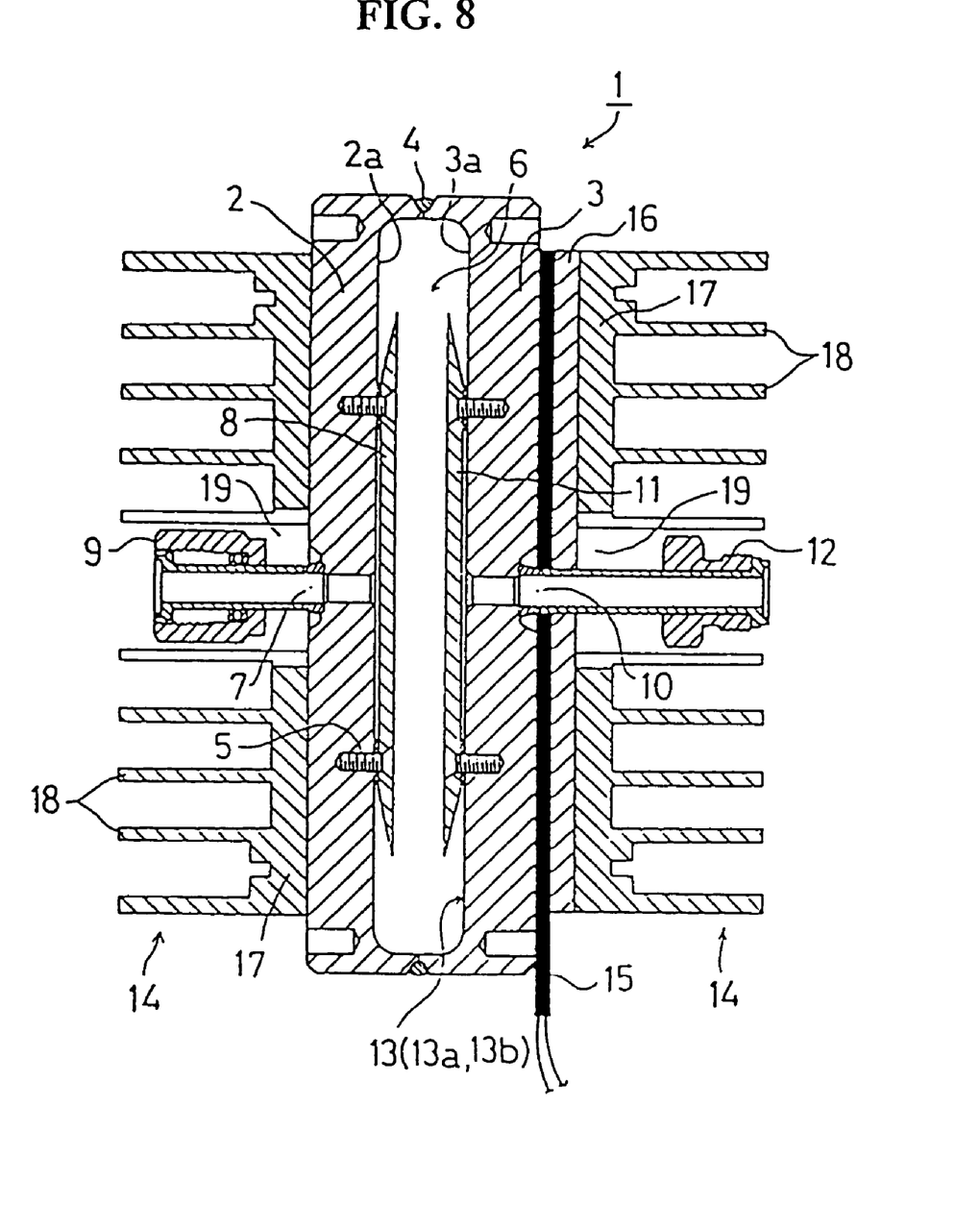
FIG. 8 is a vertical sectional view of the reactor shell of the reactor for generating moisture according to the present invention.

Embodiments of the Reduced Pressure Apparatus for Generating and Feeding High Purity Moisture FIG. 1 is a schematic diagram of an embodiment of a reduced pressure-type apparatus for generating and feeding moisture according to the present invention. From three kinds of gases—$H_2$, $O_2$ and $N_2$—, one or more gases are chosen by means of V1, V4 and/or V7 and, with the flow rate controlled by mass flow controllers MFC1, MFC2 and/or MFC3, fed into the reactor WVG for generating moisture through valves V3, V6 and/or V9. The valves V2, V5 and V8 are exhaust valves. The details of the reactor WVG for generating moisture is omitted in the drawing because it is shown in FIG. 5, 6 or FIG. 8 that will be described later. The pressure of moisture gas generated in the reactor WVG for generating moisture is measured by a pressure detector P1 and recorded by a recorder R. The moisture gas is squeezed and reduced in pressure by pressure reducing means RM (in FIG. 1, an orifice), and has its residual gas measured by hydrogen sensors S1, S2 and is then sent to a process chamber C via a filter F. The quantity of residual hydrogen is also recorded on recorder R.

The gas is heated to 140° C. in the shaded area BA to prevent the gas from adsorbing to the inside wall of the pipe.

The moisture gas sent from filter F is sampled by a sampling valve SV and the composition analyzed by a mass analyzer M. The process chamber C is a, for instance, a semiconductor manufacturing apparatus. The gas is drawn by a vacuum pump RP via a valve V10 and its internal pressure is measured by a pressure gauge P2. Unnecessary gas is discharged through a valve V11.

The pressure of the material gases flowing in mass flow controllers MFC1-3 is 2 kg/cm$^2$G. The flow rates are regulated to: $N_2$=1 SLM (liter/minute in a standard state), $H_2$=0.2-1 SLM, and $O_2$=0.5-1 SLM. The internal pressure of the process chamber C is adjusted to 1 Torr by the vacuum pump RP. The orifice used as pressure reducing means RM is 0.6 mm in diameter, and the temperature inside the reactor WVG for generating moisture is set at 350° C.

Figure 2:
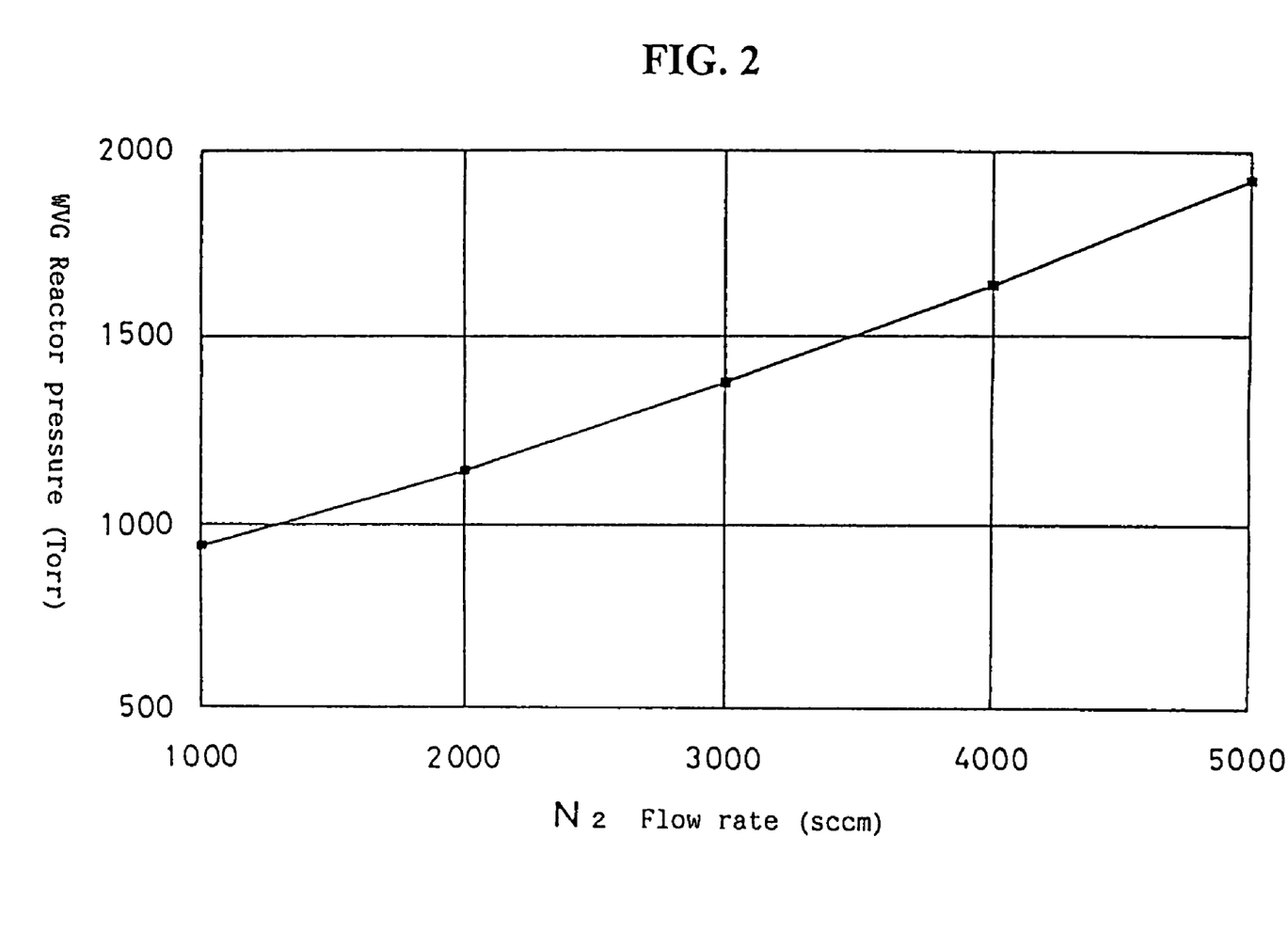
FIG. 2 is a graph showing the dependence of the pressure of the reactor for generating moisture on $N_2$ gas flow rate.

FIG. 2 is a graph showing the dependence of the pressure of the reactor for generating moisture on $N_2$ gas flow rate. With the vacuum pump RP stopped and the valve V11 opened, the process chamber C is set at the atmospheric pressure. In this, state, the equipment in FIG. 1 is purged with $N_2$ gas alone. When the flow rate of $N_2$ gas is increased in the range of 1,000 to 5,000 sccm, the pressure of the reactor will rise linearly in the range of about 900 to 1,900 Torr.

Since an orifice is installed as pressure reducing means RM, $N_2$ gas will stay to increase the pressure of the reactor as the flow rate of $N_2$ gas increases, because the flow to the downstream side is regulated by the orifice. Because the pressure is increased with $N_2$ gas, it is expected that the other mixed gas will rise in pressure.

Figure 3:
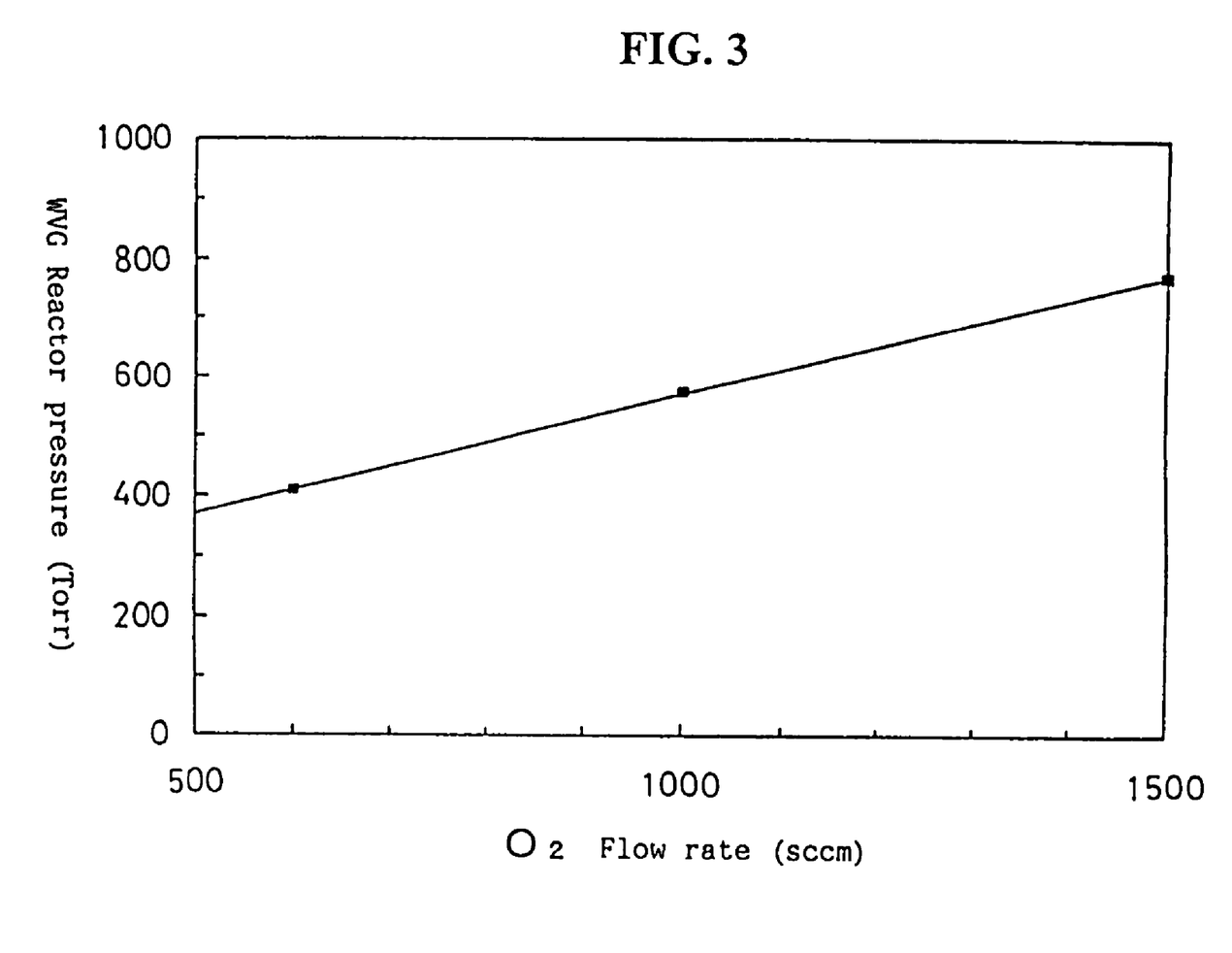
FIG. 3 is a graph showing the dependence of the pressure of the reactor for generating moisture on the flow rate of the mixed gas of $H_2$-$O_2$.

FIG. 3 is a graph showing the dependence of the pressure of the reactor for generating moisture on the flow rate of the mixed gas of $H_2$-$O_2$. Referring to FIG. 1, the pressure of the process chamber C is set at 1 Torr by operating vacuum pump RP. With the flow rate of $H_2$ gas fixed at 1,000 sccm, the flow rate of $O_2$ is increased up to 600-1,500 sccm.

Theoretically, the flow rate of $O_2$ gas to react with 1,000 sccm of $H_2$ gas is 500 sccm, and the flow rate of generated moisture gas is 1,000 sccm. In practice, however, reaction does not proceed exactly according to the theory. $H_2$ gas remains unreacted in a small quantity, and the now rate of moisture gas is slightly smaller than 1,000 sccm. To increase the total pressure of $H_2$-$O_2$, the flow rate of $O_2$, which has no adverse effect, is increased.

As is evident from FIG. 3, if the flow rate of $O_2$ gas is increased in the range of 600 to 1,500 sccm, the pressure of the reactor rises linearly in the range of about 400 to 740 Torr. It is clear from FIG. 7 that within this pressure range, the ignition point of hydrogen in the reactor is about 560° C., that is, about 210° C. higher than the set temperature of 350° C. in the reactor. Therefore, there is no possibility that hydrogen will ignite in the reactor.

Figure 4:
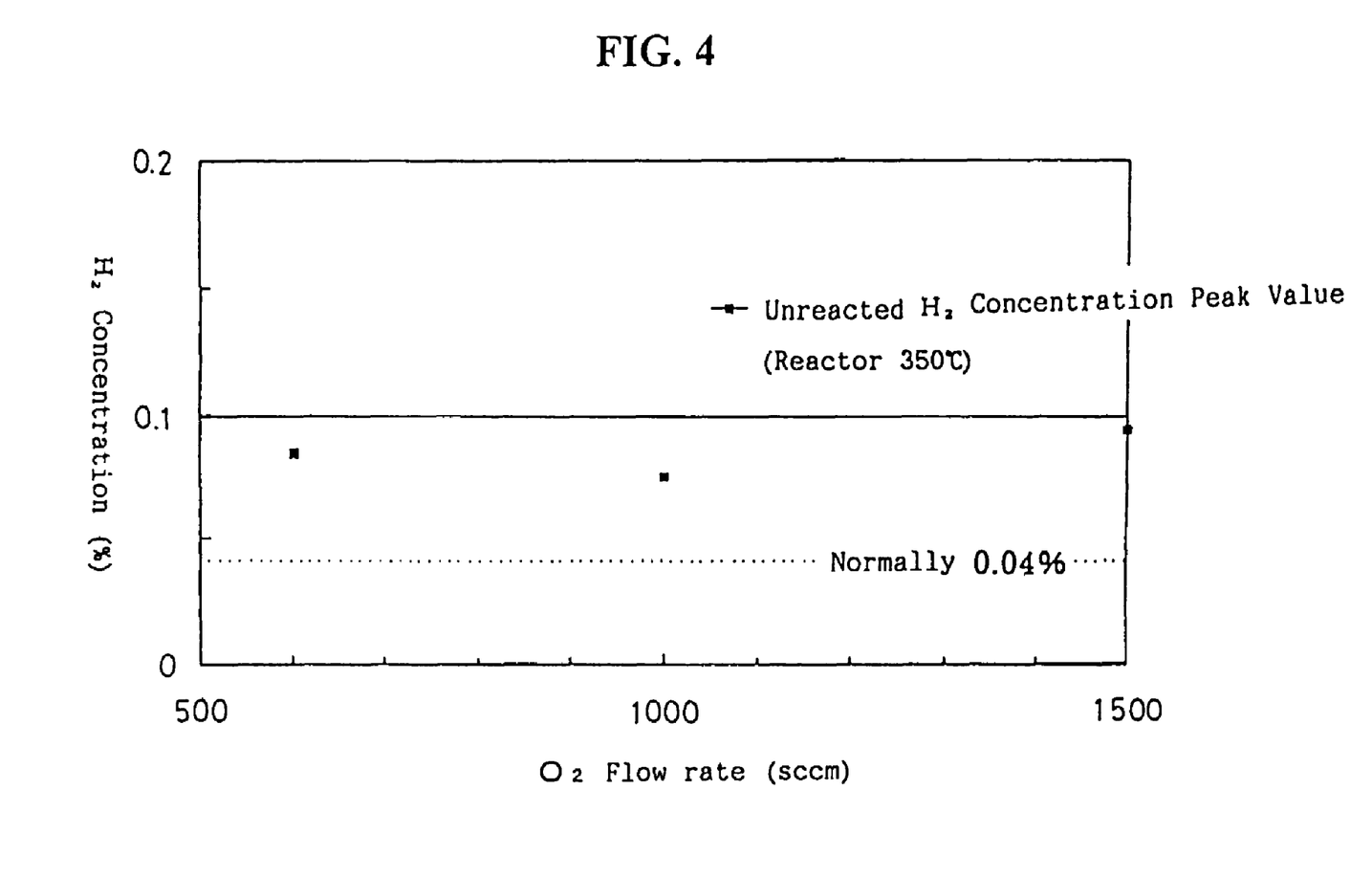
FIG. 4 is a graph showing the concentration of unreacted $H_2$ gas while the flow rate of $O_2$ gas changes as in FIG. 3.

FIG. 4 is a graph showing the concentration of unreacted $H_2$ gas while the flow rate of $O_2$ gas changes as in FIG. 3.

Even if oxygen is supplied excessively in the moisture generation reaction as shown in FIG. 3, the quantity of unreacted $H_2$ is at most some 0.08 percent. Furthermore, the pressure in the reactor can be maintained at a high level by the pressure reducing means of the present invention. Thus, the ignition point rises, which definitely keeps hydrogen from igniting and ensures that moisture can be produced safely.

In FIG. 1, an orifice is used as pressure reducing means RM. As an alternative to that, a valve may be used. In case a valve is used, the flow rate can be adjusted because the opening of the valve is variable. Thus, the pressure within the reactor for generating moisture can be freely adjusted. Also, any means that has a squeezing mechanism and permits adjustment of pressure or produces pressure loss can be used as pressure reducing means RM, for example, nozzles, Venturi tubes, capillaries, and filters.

The present invention is not limited to the embodiments just described. It is to be understood that changes and variations may be made without departing from the spirit or scope of the present invention.

Embodiment of Heat Dissipation Reactor for Generating Moisture

FIG. 8 is a vertical, sectional view of the reactor shell of the reactor for generating moisture according to the present invention. The construction will be explained briefly. In FIG. 8, the same reference numbers are used to refer to the same parts as in FIG. 5.

The reactor shell 1 comprises a reactor structural component 2 on the inlet side, a recess 2a, a reactor structural component 3 on the outlet side, a recess 3a, welds 4, screw bolts 5, an interior space 6, a material gas supply passage 7, a reflector 8 on the inlet side, a material gas supply joint 9, a moisture gas outlet passage 10, a reflector 11 on the outlet side, a moisture gas take-out joint 12, a platinum coated catalyst layer 13, a barrier coat 13a, a platinum coat 13b, heat dissipation units 14, a heater 15 and a heater pressing plate 16.

Figure 9:
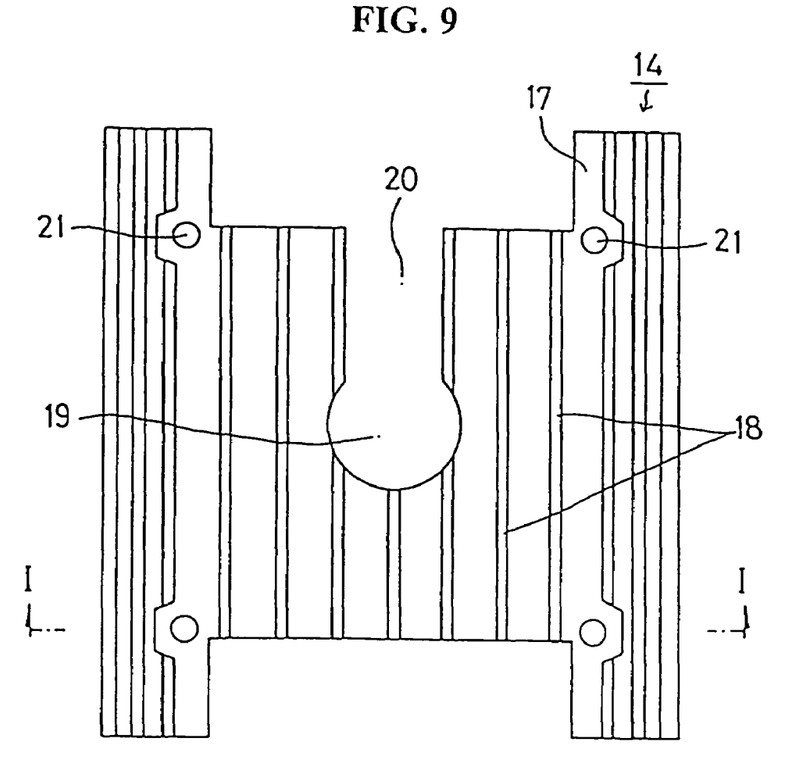
FIG. 9 is a top view of the heat dissipation unit according to the present invention.
Figure 10:
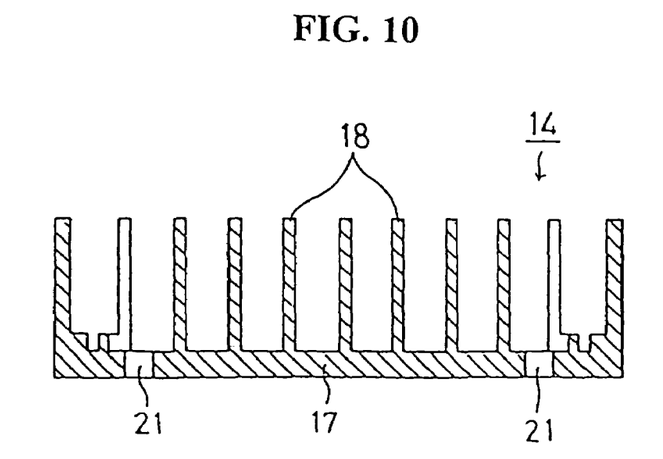
FIG. 10 is a sectional view taken on line I-I in FIG. 2.

FIG. 9 is a top view of the heat dissipation unit 14, while FIG. 10 is a sectional view taken on line I-I in FIG. 9. The heat dissipation unit 14 which releases heat has a large number of heat dissipation fins 18 disposed in parallel on the base plate. In the center, there is provided a through hole 19 for the joint. A cut 20 is made that extends from the through hole 19 for the joint to the upper side of fine base plate 17. At the four corners of the fin base plate 17, fixing bolt holes 21 are defined that reach reactor structural components 2, 3.

The fin base plate 17 and heat dissipation fins 18 are formed roughly central symmetrically with the through hole 19 for the joint serving as center.

In FIG. 9, the fin formation is not perfectly but roughly central symmetrical because the cut 20 is formed in unit 14. Because of this roughly central symmetry, the heat dissipation of the heat dissipation unit 14 exhibits a central symmetry.

The unit is so designed that, because of this central symmetry, the temperatures at two different points equally distant from the center and located on the same diametric line are about the same. If the heat dissipation characteristics of the reactor structural components 2, 3 are made central symmetric, then the temperature distribution in the interior space 6 of FIG. 6 also can be made central symmetric. Moisture generation reaction can be equalized central symmetrically, and thus the temperature in the reactor shell 1 can be prevented from rising locally. In other words, this prevents hydrogen gas and oxygen gas from locally igniting, thus promoting the safety of the reactor for generating moisture and prolonging the life of the reactor.

Figure 11:
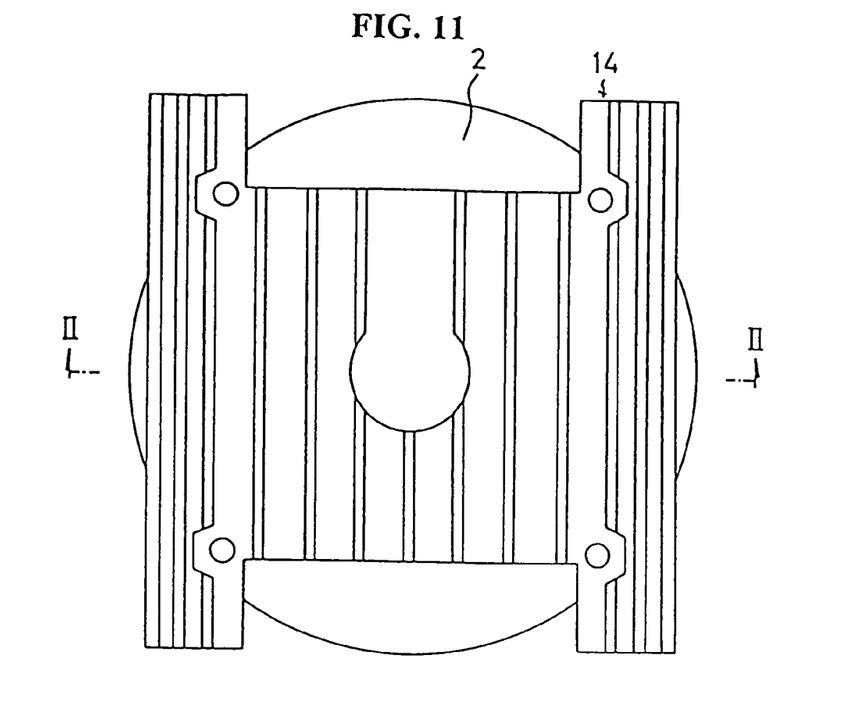
FIG. 11 is a side view of the reactor for generating moisture with the heat dissipation unit clamped on the reactor structural component on the inlet side.

FIG. 11 is a side view of the reactor for generating moisture with the heat dissipation unit clamped on the reactor structural component on the inlet side. FIG. 8 is a section taken on line II-II in FIG. 11.

To attach the heat dissipation unit 14 (FIG. 10) on the reactor structural component 2 on the inlet side, the material gas supply joint 9 is first inserted through the through hole 19 for the joint, and the fin base plate 17 is closely placed oil the outside wall of the reactor structural component 2 on the inlet side. Then, bolts (not shown) are screwed in and tightened up through the fixing bolt holes 21.

To attach the heat dissipation unit 14 on the reactor structural component 3 on the outlet side, the moisture gas take-out point 12 is first inserted through the heater 15, the heater pressing plate 16 and the through hole 19 for the joint. Then, the fin base plate 17 is placed closely on the heater pressing plate 16, and bolts are screwed in and tightened up through the fixing boll hole 21.

The inventors conducted intensive research in seeking to raise the heat dissipation efficiency of the heat dissipation unit 14, and found that the heat dissipation can be improved by giving an alumite treatment to the surfaces of the heat dissipation fins 18.

Alumite treatment generally means formation of a thin oxide film on aluminum or aluminum alloy. Colored alumite treatment is now possible. Alumite treatment is generally applied to increase the resistance to corrosion and wear. The inventors found that alumite treatment is effective in improving heat dissipation.

The larger the area of alumite treatment, the greater the heat dissipation of the heat dissipation unit 14 is. Therefore, it is preferable to give an alumite treatment not only to the surfaces of heat dissipation fins 18 but also to the surface of the fin base plate 17.

To compare the alumite treated heat dissipation fins and the untreated fins in heat dissipation, the inventors tested three kinds of reactors for generating moisture—one with alumite treated heat dissipation fins, another having fins with no aluminite treatment, and still another without heat dissipation fins.

Figure 12:
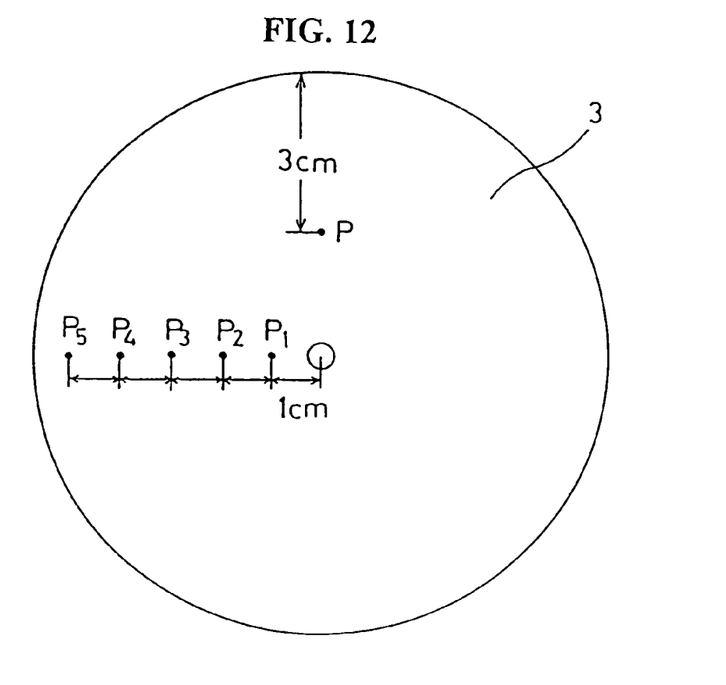
FIG. 12 is an end view of the reactor structural component on the outlet side.

FIG. 12 is an end view of the reactor structural component 3 on the outlet side. The reactor structural component 3 on the outlet side was holed at five points. The five holes were drilled at intervals of 1 cm starting with a point 1 cm away from the center. Five thermocouple $P_1$-$P_5$ for measurement of temperature distribution were put each 1 mm away from the inside wall to measure the temperature distribution in the radial direction in the interior space 6 on the downstream side. Furthermore, a thermocouple P for temperature regulation to measure the temperature on the downstream side was inserted at a point 3 cm away from the perimeter so as to see how much the temperature was different from the set temperature of the heater 15. Also, the temperature on the upstream side was measured at the corresponding point on the reactor structural component 2 on the inlet side.

With $H_2/O_2$ set at 10/6, or with excessive supply of oxygen, moisture was produced in the oxygen rich state. That is because the oxygen rich state increases the moisture generation efficiency and reduces unreacted material gases. The measurement results are shown in Table 1. Measurements of thermocouple $P_1$ are not given in the table. (See Table 1).

As shown in Table 1, the temperatures on the downstream side almost agree with the set temperatures, which indicate that the heater 15 works according to the regulated and set temperature. The temperature is regulated and set to send generated water vapor to the subsequent facilities. The temperature is set at 300° C. as an example. It is also pointed out that the temperature on the upstream side is lower than that on the downstream side. That indicates that moisture generation hardly takes place in the interior space 6 on the inlet side.

In the interior space 6 on the outlet side, moisture generation reaction is caused by the platinum catalyst, and therefore, the temperatures are distributed, high around the edge to low in the center. Of the thermocouple $P_2$-$P_5$, thermocouple $P_4$, which 4 cm away from the center, shows the highest temperature. It means that moisture generation or heat is liable to concentrate at that position. That is because the higher the moisture generation is, the larger the self-heating is. It is understood that the unit for the quantity of moisture generation is SLM, or liter/minute in the standard state.

TABLE 1

Measurement results of temperature in reactor for generating moisture (1)

| Reactor | Gas (SLM) | Temperature P(° C.) on upstream side | Temperature P(° C.) on Downstream side | Set Temperature (° C.) | Temperature (° C.) at a point $P_5$ 5 cm from downstream center | Temperature (° C.) at a point $P_4$ 4 cm from downstream center | Temperature (° C.) at a point $P_3$ 3 cm from downstream center | Temperature (° C.) at a point $P_2$ 2 cm from downstream center |
|---|---|---|---|---|---|---|---|---|
| Without fins | $N_2$ 1 | 238 | 302 | 300 | 277 | 283 | 290 | 295 |
|  | $H_2O$ 1 | 315 | 376 | — | 380 | 384 | 377 | 371 |
|  | $H_2O$ 1.5 | 390 | 471 | — | 478 | 484 | 474 | 466 |
| With heat dissipation fins disposed in parallel (without alumite treatment) | $N_2$ 1 | 198 | 302 | 300 | 274 | 282 | 290 | 295 |
|  | $H_2O$ 2 | 287 | 406 | — | 427 | 436 | 418 | 403 |
|  | $H_2O$ 2.5 | 327 | 467 | — | 491 | 502 | 481 | 464 |
| With heat dissipation fins disposed in parallel (with hard alumite 20 μm thick) | $N_2$ 1 | 210 | 351 | 350 | 314 | 326 | 336 | 343 |
|  | $N_2$ 1 | 184 | 302 | 300 | 270 | 280 | 289 | 295 |
|  | $H_2O$ 2 | 234 | 356 | — | 379 | 389 | 369 | 353 |
|  | $H_2O$ 2.5 | 265 | 411 | — | 435 | 448 | 426 | 407 |
|  | $H_2O$ 3 | 295 | 466 | — | 493 | 509 | 482 | 461 |

If the upper limit temperature for safe operation of the reactor for generating moisture is 450° C., for example, the quantity of moisture generation where thermocouple $P_4$ indicates a temperature below 450° C. can be regarded as the quantity within the safe operation range.

Therefore, the upper limits of moisture generation for the respective reactors are: the reactor without fins=1 SLM, the reactor with untreated fins=2 SLM, and the reactor with hard alumite-treated fins=2.5 SLM. In other words, provision of fins can increase moisture generation twice, and provision of alumite-treated fins can raise moisture generation 2.5 times.

The above-mentioned alumite is a hard alumite 20 μm thick. Tests were also conducted with colored alumite (black) 20 μm thick and hard alumites 5-50 μm. They made little difference. That is, readings of thermocouple $P_2$-$P_5$ were varied only within several degrees.

In Table 2, temperatures are measured in the reactor for generating moisture with different thicknesses of alumite and different kinds of alumite with the moisture generation at 2.5 SLM. (See Table 2).

To summarize, heat dissipation fins are effective in dissipating heat and narrowing the temperature distribution. The moisture generation can be increased about twice.

It is also noted that alumite treatment on heat dissipation fins can improve heat radiation rate. That is, the temperature can be lowered by some 50° C. in comparison with the fins having no alumite treatment. And the moisture generation can be increased some 2.5 times.

The results shown in Table 1 are for heat dissipation fins disposed central symmetrically as shown in the drawing. The same results can be obtained with heat dissipation fins disposed roughly axial symmetrically. It is understood that axial symmetry means a concentric arrangement of heat dissipation fins. In the axial symmetrical arrangement, the aforesaid temperature distribution will also be axial symmetrical, which can enhance evenness in the interior space 6 for moisture generation.

The pressure reduction and ignition prevention can be effected by such simple pressure reducing means as an orifice. In case a valve is used as pressure reducing means, it is possible to vary and adjust the opening and also the degree of ignition prevention.

Unreacted hydrogen contained in moisture gas can be minimized, which further enhances the safety along with the pressure reducing means, because the platinum coated catalyst layer causes hydrogen and oxygen to react into moisture with a high efficiency.

The temperature in the reactor shell can be lowered by dissipating moisture generation heat through heat dissipation fins, and the quantity of moisture generation can be increased.

Moisture generated by maintaining the temperature in the reactor shell at a proper level with a heater can be led out as stable water vapor flow to the subsequent facilities.

The temperature distribution in the reactor can be made centrally or axially symmetrical, preventing the temperature from rising locally and effecting safe and smooth moisture generation in the reactor shell, because heat dissipation fins are disposed roughly centrally or axially symmetrical.

The temperature in the reactor shell can be further lowered and therefore the moisture generation can be further increased, because the surfaces of heat dissipation fins are alumite-treated to improve heat dissipation.

What is claimed is:

1. A reactor for generating moisture, having an inlet side and an outlet side, comprising:

a first reactor structural component on the inlet side of the reactor having an outside wall;

TABLE 2

Measurement results of temperature in reactor for generating moisture (2)

| Thickness and kind of alumite | | Gas (SLM) | Temperature (° C.) at a point $P_5$ 5 cm from downstream center | Temperature (° C.) at a point $P_4$ 4 cm from downstream center | Temperature (° C.) at a point $P_3$ 3 cm from downstream center | Temperature (° C.) at a point $P_2$ 2 cm from downstream center |
|---|---|---|---|---|---|---|
| Hard alumite | 5 μm | $H_2O$ 2.5 | 439 | 453 | 429 | 412 |
| Hard alumite | 10 μm | $H_2O$ 2.5 | 437 | 451 | 428 | 410 |
| Hard alumite | 15 μm | $H_2O$ 2.5 | 436 | 451 | 427 | 409 |
| Hard alumite | 50 μm | $H_2O$ 2.5 | 435 | 448 | 425 | 406 |
| Colored alumite | 20 μm | $H_2O$ 2.5 | 433 | 445 | 424 | 405 |

The present invention is not limited to the embodiment and examples just described and it is to be understood that changes and variations may be made without departing from the spirit or scope of the present invention.

Effects of the Invention

The invention has the following advantageous effects:

Hydrogen gas can be reduced in pressure by pressure reducing means provided on the downstream side of the reactor for generating moisture before being supplied to the downstream side.

Ignition of hydrogen can be prevented without fail and, therefore, a safe and stable supply of moisture can be provided because the internal pressure in the reactor can be maintained at a high level.

a second reactor structural component on the outlet side of the reactor having an outside wall, wherein the first and second components are mated to form a reactor shell having an interior space;

a material gas supply passage provided in the first reactor structural component disposed to supply material gases into the interior space;

a material gas supply joint connected to the material gas supply passage;

a moisture gas outlet passage provided in the second reactor structural component to lead out moisture from the interior space;

a moisture gas take-out joint connected to the moisture gas outlet passage;

fin base plates attached to the outside walls of the first and second components;

a plurality of fins disposed on the fin base plates, wherein the fins are disposed centrally symmetrical about the material gas supply joint and the moisture gas take-out joint;

a heater, having an outside, disposed on the outside wall of the second component; and a heater pressing plate, having an outside, disposed to press on the outside of the heater, wherein the fin base plate is attached to the outside of the heater pressing plate, wherein at least one of the fin base plates comprises a through hole for the corresponding joint, and a cut that extends from the through hole and has a width smaller than a diameter of the through hole.

2. A reactor for generating moisture according to claim 1, wherein said fins are axially symmetrical about said material gas supply joint.

3. A reactor for generating moisture according to claim 1, wherein said fins are axially symmetrical about said moisture take-out joint.

4. A reactor for generating moisture according to claim 1, wherein said fins comprise surfaces treated with alumite.

5. A reactor for generating moisture, having an inlet side and an outlet side, comprising:

a first reactor structural component on the inlet side of the reactor having an outside wall;

a second reactor structural component on the outlet side of the reactor having an outside wall, wherein the first and second components are mated to form a reactor shell having an interior space;

a material gas supply passage provided in the first reactor structural component disposed to supply material gases into the interior space;

a material gas supply joint connected to the material gas supply passage;

a moisture gas outlet passage provided in the second reactor structural component to lead out moisture from the interior space;

a moisture gas take-out joint connected to the moisture gas outlet passage;

fin base plates attached to the outside walls of the first and second components;

a plurality of fins disposed on the fin base plates;

a heater, having an outside, disposed on the outside wall of the second component; and a heater pressing plate, having an outside, disposed to press on the outside of the heater, wherein the fin base plate is attached to the outside of the heater pressing plate, wherein at least one of the fin base plates comprises a through hole for the corresponding joint, and a notch connected with the through hole and having a width that is smaller than the diameter of the through hole.

6. A reactor for generating moisture according to claim 5 wherein said fins are disposed symmetrically about the material gas supply joint.

7. A reactor for generating moisture according to claim 5 wherein said fins are disposed symmetrically about the moisture gas take-out joint.

8. A reactor for generating moisture according to claim 5, wherein said fins comprise surfaces treated with alumite.

9. A reactor for generating moisture according to claim 6, wherein said fins are axially symmetrical about said material gas supply joint.

10. A reactor for generating moisture according to claim 6, wherein said fins are axially symmetrical about said moisture take-out joint.

11. A reactor for generating moisture according to claim 6, wherein said fins are centrally symmetrical about said moisture take-out joint.

* * * * *